(12) United States Patent
Stumpf et al.

(10) Patent No.: US 12,524,190 B2
(45) Date of Patent: Jan. 13, 2026

(54) DISPLAY COMPONENT FOR ACTIVE INFORMATION TAG FOR A SERVER TYPE INFORMATION HANDLING SYSTEM

(71) Applicant: Dell Products L.P., Round Rock, TX (US)

(72) Inventors: Michael J. Stumpf, Cedar Park, TX (US); Timothy M. Lambert, Austin, TX (US); Ryan Pischinger, Lubbock, TX (US); Jessica Romero, Helotes, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/415,306

(22) Filed: Jan. 17, 2024

(65) Prior Publication Data

US 2025/0231730 A1   Jul. 17, 2025

(51) Int. Cl.
*G06F 3/147* (2006.01)
*G06F 3/044* (2006.01)

(52) U.S. Cl.
CPC .............. *G06F 3/147* (2013.01); *G06F 3/044* (2013.01)

(58) Field of Classification Search
CPC ................................. G06F 3/147; G06F 3/044
See application file for complete search history.

(56) References Cited

U.S. PATENT DOCUMENTS

| | | | | |
|---|---|---|---|---|
| 6,747,874 B2* | 6/2004 | McKinnon | ........... | H05K 7/1491 312/298 |
| 7,259,683 B2* | 8/2007 | Abe | ....... | G11B 33/10 340/687 |
| 7,812,737 B1* | 10/2010 | Hunter | ........ | H01R 13/641 340/687 |
| 8,576,570 B2* | 11/2013 | Nguyen | ........ | G06F 1/1601 361/736 |
| 9,250,649 B2* | 2/2016 | Shabbir | ........ | G06F 1/16 |
| 10,251,303 B2* | 4/2019 | Hartman | ........ | G06F 11/3044 |
| 10,936,381 B1 | 3/2021 | Poblete et al. | | |
| 11,347,986 B1* | 5/2022 | Donachy | ........ | G06F 3/147 |
| 11,593,057 B2* | 2/2023 | Donachy | ........ | G08B 5/36 |
| 11,886,249 B2* | 1/2024 | Donachy | ........ | G06F 1/1615 |
| 2008/0012717 A1* | 1/2008 | Chen | ........ | G06F 11/324 340/653 |
| 2008/0065805 A1* | 3/2008 | Wu | ........ | G06F 1/186 710/2 |
| 2009/0243873 A1 | 10/2009 | Mizukawa et al. | | |

(Continued)

OTHER PUBLICATIONS

R. Lai, Engadget, Rimowa's electronic luggage tag is the future of traveling, Jul. 7, 2016.

(Continued)

*Primary Examiner* — Grant Sitta
(74) *Attorney, Agent, or Firm* — Terrile, Cannatti & Chambers, LLP; Stephen A. Terrile

(57) ABSTRACT

A display component for an active information tag is disclosed for performing an active information tag operation. The display component includes a display component housing; and, a display portion, the display portion being controlled by an active information tag controller, the display portion comprising a plurality of touch sensitive display elements, the plurality of touch sensitive display elements being arranged on the display component housing in a repeating pattern.

12 Claims, 14 Drawing Sheets

(56) References Cited

U.S. PATENT DOCUMENTS

| | | | |
|---|---|---|---|
| 2010/0005625 A1* | 1/2010 | Chuan | G06F 1/1601 |
| | | | 16/366 |
| 2013/0069781 A1* | 3/2013 | Terwilliger | G06Q 10/08 |
| | | | 340/539.13 |
| 2014/0253289 A1 | 9/2014 | Groth et al. | |
| 2016/0071494 A1 | 3/2016 | Hwang | |
| 2016/0104397 A1 | 4/2016 | Kim et al. | |
| 2016/0182130 A1 | 6/2016 | Ahmed et al. | |
| 2017/0046242 A1 | 2/2017 | Ragupathi et al. | |
| 2019/0079621 A1* | 3/2019 | Yoshida | G06F 3/044 |
| 2019/0129564 A1* | 5/2019 | Kim | G06F 3/04166 |
| 2020/0349505 A1 | 11/2020 | Coleman | |
| 2021/0035509 A1 | 2/2021 | Hu et al. | |
| 2021/0153310 A1* | 5/2021 | Van Neer | H05B 45/305 |
| 2023/0022837 A1 | 1/2023 | Donachy et al. | |

OTHER PUBLICATIONS

IBM, Light Path Diagnostics, https://systemx.lenovofiles.com/help/index.jsp?topic=%2Fcom.lenovo.sysx.7383.doc%2Fc_light_path_diagnostics.html, downloaded from the internet Jul. 23, 2021.

* cited by examiner

DISPLAY COMPONENT FOR ACTIVE INFORMATION TAG FOR A SERVER TYPE INFORMATION HANDLING SYSTEM

BACKGROUND OF THE INVENTION

Field of the Invention

The present invention relates to information handling systems. More specifically, embodiments of the invention relate to providing information handling systems with active information tags.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to display component for an active information tag comprising: a display component housing; and, a display portion, the display portion being controlled by an active information tag controller, the display portion comprising a plurality of touch sensitive display elements, the plurality of touch sensitive display elements being arranged on the display component housing in a repeating pattern.

In another embodiment the invention relates to an active information tag comprising: a tag housing, a portion of the tag housing being sized to fit within a recess of an information handling system; a control portion, the control portion including an information portion mounted to a front portion of the tag housing and coupled to the control portion, the information portion being visible when the tag housing is in a closed position relative to the information handling system; and, a display component coupled to the control portion, the display component comprising a display component housing; and, a display portion, the display portion being controlled by an active information tag controller, the display portion comprising a plurality of touch sensitive display elements, the plurality of touch sensitive display elements being arranged on the display component housing in a repeating pattern.

In another embodiment the invention relates to a system comprising: a processor; a data bus coupled to the processor; and an active information tag comprising: a tag housing, a portion of the tag housing being sized to fit within a recess of an information handling system; a control portion, the control portion including an information portion mounted to a front portion of the tag housing and coupled to the control portion, the information portion being visible when the tag housing is in a closed position relative to the information handling system; and, a display component coupled to the control portion, the display component comprising a display component housing; and, a display portion, the display portion being controlled by an active information tag controller, the display portion comprising a plurality of touch sensitive display elements, the plurality of touch sensitive display elements being arranged on the display component housing in a repeating pattern.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
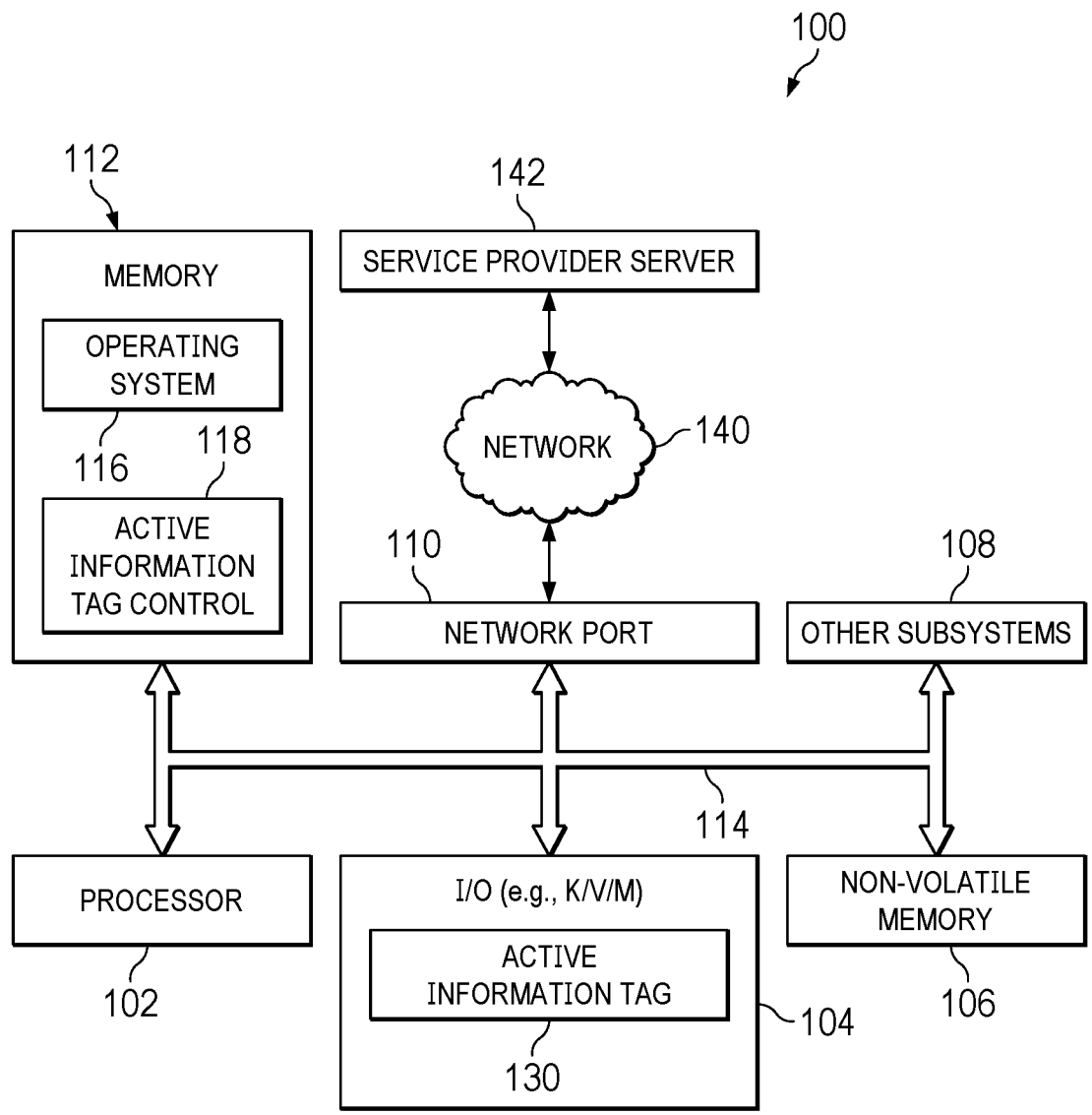
FIG. 1 shows a general illustration of components of an information handling system as implemented in the system and method of the present invention.

Certain aspects of the present disclosure reflect an appreciation that server and storage type information handling system front end area use is at a premium. There is limited room for user interaction zones and the space available is valuable for provision of server "payloads" such as hard drives and peripherals. Certain aspects of the present disclosure reflect an appreciation that customers often value displays which can help users diagnose issues which are accessible via the front end of the server. Certain known server type information handling systems provide a bezel with a display (located on the left or right edge of the bezel (e.g., the ears of the bezel). For certain known server type information handling systems the display is touch sensitive. Certain aspects of the present disclosure include an appreciation that as data center hardware continues to evolve, available real-estate on the front and rear of these solutions becomes more scarce.

Certain aspects of the present disclosure include an appreciation that it is known to provide server type information handling systems with interactive liquid crystal display (LCD) as part of a base system or located on a bezel of the server type information handling system. Certain aspects of the present disclosure include an appreciation that known interactive LCDs as part of base system or located on the bezel can block air flow and can often require more power from the information handling system. Certain aspects of the present disclosure include an appreciation that LCDs can be difficult to procure for multiple generations are typically single sourced. Certain aspects of the present disclosure include an appreciation that LCDs can have display issues such as burn-in issues and color distortion issues.

Certain aspects of the present disclosure include an appreciation that an enterprise service tag (often referred to as a luggage tag) is often associated with server type information handling systems. Certain aspects of the present disclosure include an appreciation that known enterprise service tags present static data via a priori stickers when the enterprise service tag is extended from the server type information handling system. Certain aspects of the present disclosure include an appreciation that known enterprise service tags do not provide information when fully inserted in a server type information handling system chassis.

Certain aspects of the present disclosure include an appreciation that it would be desirable to provide a means for presenting rich information while an enterprise service tag is inserted in the server type information handling system. Certain aspects of the present disclosure include an appreciation that it would be desirable to provide a means for providing interaction for a gross superset of information when the enterprise service tag is extended from the server type information handling system. Certain aspects of the present disclosure include an appreciation that it would be desirable to provide a means for tethering an active information entity to a chassis of a server type information handling system. Certain aspects of the present disclosure include an appreciation that LED type displays do not change over decades can be multi-sourced.

Certain aspects of the present disclosure include an appreciation that it is known to provide display arrays such as LED type display arrays. Certain aspects of the present disclosure include an appreciation that display arrays are useful in presenting scrolling messages. Certain aspects of the present disclosure include an appreciation that it is known to provide display arrays such as LED type display arrays can provide manufacturability and usability advantages for displaying information such as server type information handling system status.

In one embodiment, an active information tag and a system, method, and computer-readable medium for controlling an active information tag are disclosed. In certain embodiments, the active information tag provides a mechanism that moves control panel interaction zones from left or right rack edges to an area of the server which has traditionally been underutilized. Such an active information tag enables maximum payload space for all server type information handling system architectures. Such an active information tag does not sacrifice the user experience and consumes less space across the front of the server type information handling system. Such an active information tag reduces complexity of rack edge designs. Such an active information tag provides a slim display panel which is positioned along the chassis floor of a server type information handling system.

Such an active information tag provides a plurality of functions including hardware branding and/or sub-branding (such as hardware type and model/series identification), platform and node behavior identification (e.g., via single and bi-color embedded LEDs), service and/or warranty information (which can include at-the-box technical publication repository portal access).

Such an active information tag can provide platform and/or node behavior identification which includes a system health indication. In certain embodiments, such an active information tag includes a system health indicator which facilitates locating a particular system within a data center. Such an active information tag facilitates a determination of the health of a system which is visible from the front of the platform.

In certain embodiments, the active information tag is power via auxiliary portion. In certain embodiments, the active information tag is tethered to an information handling system chassis. In certain embodiments, the active information tag includes a flexible substrate on which information such as scrolling information, is presented. In certain embodiments, the active information tag replaces a static enterprise service tag.

In certain embodiments, the active information tag includes an externally facing light bar that provides system health and chassis identity information even when the active information tag is fully recessed. In certain embodiments, the active information tag is relatively flat to not obstruct air flow, yet when extended provides a much larger interface area than traditional LCDs (e.g., for seeing impaired or for seeing from a long distance. In certain embodiments, the active information tag displays can include black & white or RGB LED arrays for richer viewing experiences. In certain embodiments, the active information tag can include an electro physical switch or ambient light sensor which saves power, reduces light pollution, minimizes heat production of the active information tag. In certain embodiments, the active information tag includes an ability to interact with the menu systems of the display device, including images and text with variable scroll rate. In certain embodiments, actuating buttons of a control portion or holding a portion of the display device can produce a faster scroll rate. In certain embodiments, an underside of the active information tag is available for static stickers which may be used to read or scan when no power is applied to the active information tag.

In another embodiment, an active information tag and a system, method, and computer-readable medium for controlling an active information tag are disclosed. In certain embodiments, the active information tag provides a mechanism that moves control panel interaction zones from left or right rack edges to an area of the server which has traditionally been underutilized. In certain embodiments, the active information tag includes a touch sensitive display portion.

In certain embodiments, the touch sensitive display portion includes an interactive display array. In certain embodiments, the display array includes a plurality of touch sensitive display elements. In certain embodiments, the display array includes capacitive sensing (also referred to as capsense) touch inputs. In certain embodiments, such a touch sensitive display array provides a minimalistic interactive LED array & input device. In certain embodiments, such a touch sensitive display array provides a rich, at-the-box user experience on a large, easy-to-use screen.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise active information tag control system 118. In one embodiment, the information handling system 100 is configured to download the active information tag control system 118 from the service provider server 142. In another embodiment, the active information tag control system 118 is provided as a service from the service provider server 142. In certain embodiments, the I/O devices 104 include an active information tag 130.

The active information tag control system performs an active information tag control operation. In certain embodiments, the active information tag control operation interacts with and controls an active information tag 130 during operation of an information handling system 100. In certain embodiments, the active information tag control operation includes an ability to dynamically present information (i.e., present information which may continuously change).

In another embodiment, an active information tag and a system, method, and computer-readable medium for controlling an active information tag are disclosed. In certain embodiments, the active information tag provides a mechanism that moves control panel interaction zones from left or right rack edges to an area of the server which has traditionally been underutilized. In certain embodiments, the active information tag includes a touch sensitive display portion.

In certain embodiments, the touch sensitive display portion includes an interactive display array. In certain embodiments, the display array includes a plurality of touch sensitive display elements. In certain embodiments, the display array includes capacitive sensing (also referred to as capsense) touch inputs. In certain embodiments, such a touch sensitive display array provides a minimalistic interactive LED array & input device. In certain embodiments, such a touch sensitive display array provides a rich, at-the-box user experience on a large, easy-to-use screen.

Figure 2:
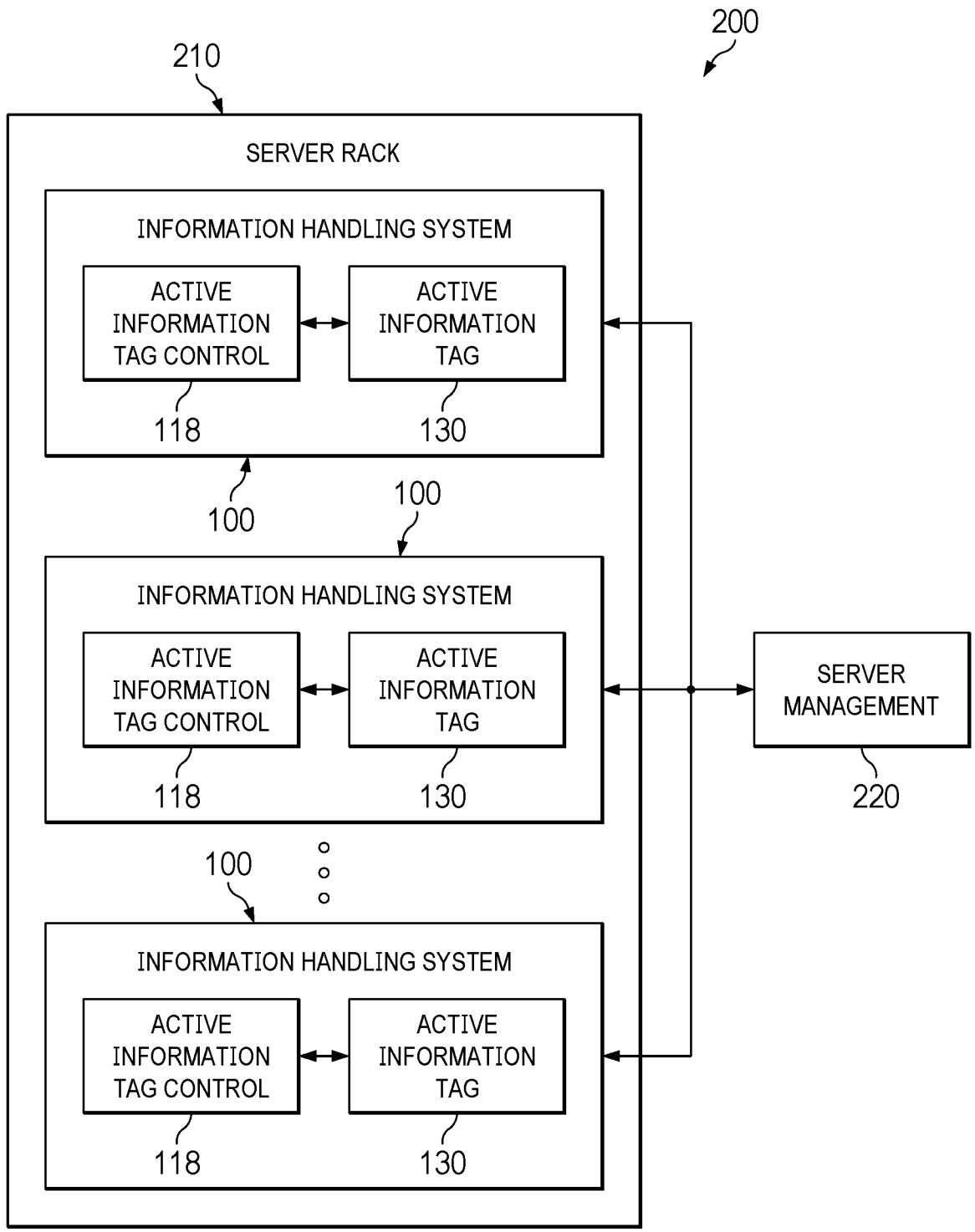
FIG. 2 shows a block diagram of a server rack having a plurality of information handling systems.

FIG. 2 shows a block diagram of a server environment 200 having a plurality of server type information handling systems. In certain embodiments, the server environment 200 includes one or more server racks 210. In certain embodiments, the server racks 210 may be located within a data center. In certain embodiments, each server type information handling system corresponds to an information handling system 100. Some or all of the information handling systems 100 include a respective active information tag 130 and active information tag control system 118. In certain embodiments, the active information tag control system receives information from a server management system 220. In certain embodiments, the active information tag control system 118 controls presentation of information via the active information tag 130. In certain embodiments, the active information tag control system 118 controls presentation of information via a control portion screen, a LED information portion, a scrolling LED screen, or a combination thereof.

As used herein, a data center broadly refers to a building, a dedicated space within a building, or a group of buildings, used to house a collection of interrelated data center assets implemented to work in combination with one another for a particular purpose. As likewise used herein, a data center asset broadly refers to anything tangible, or intangible, that can be owned, controlled, or enabled to produce value as a result of its use within a data center. In certain embodiments, a data center asset may include a product, or a service, or a combination of the two. In certain embodiments, a data center asset includes an information handling system.

Figure 3:
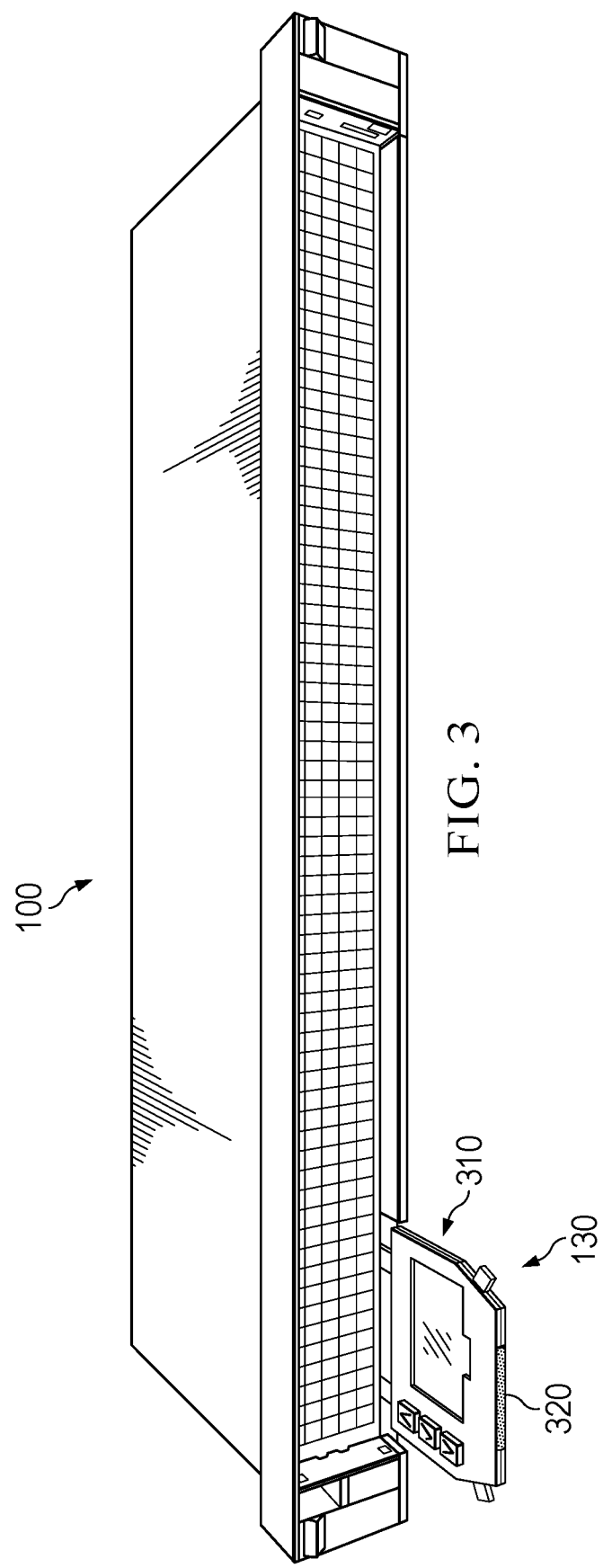
FIG. 3 shows a perspective view of an information handling system having an active information tag.
Figure 4A:
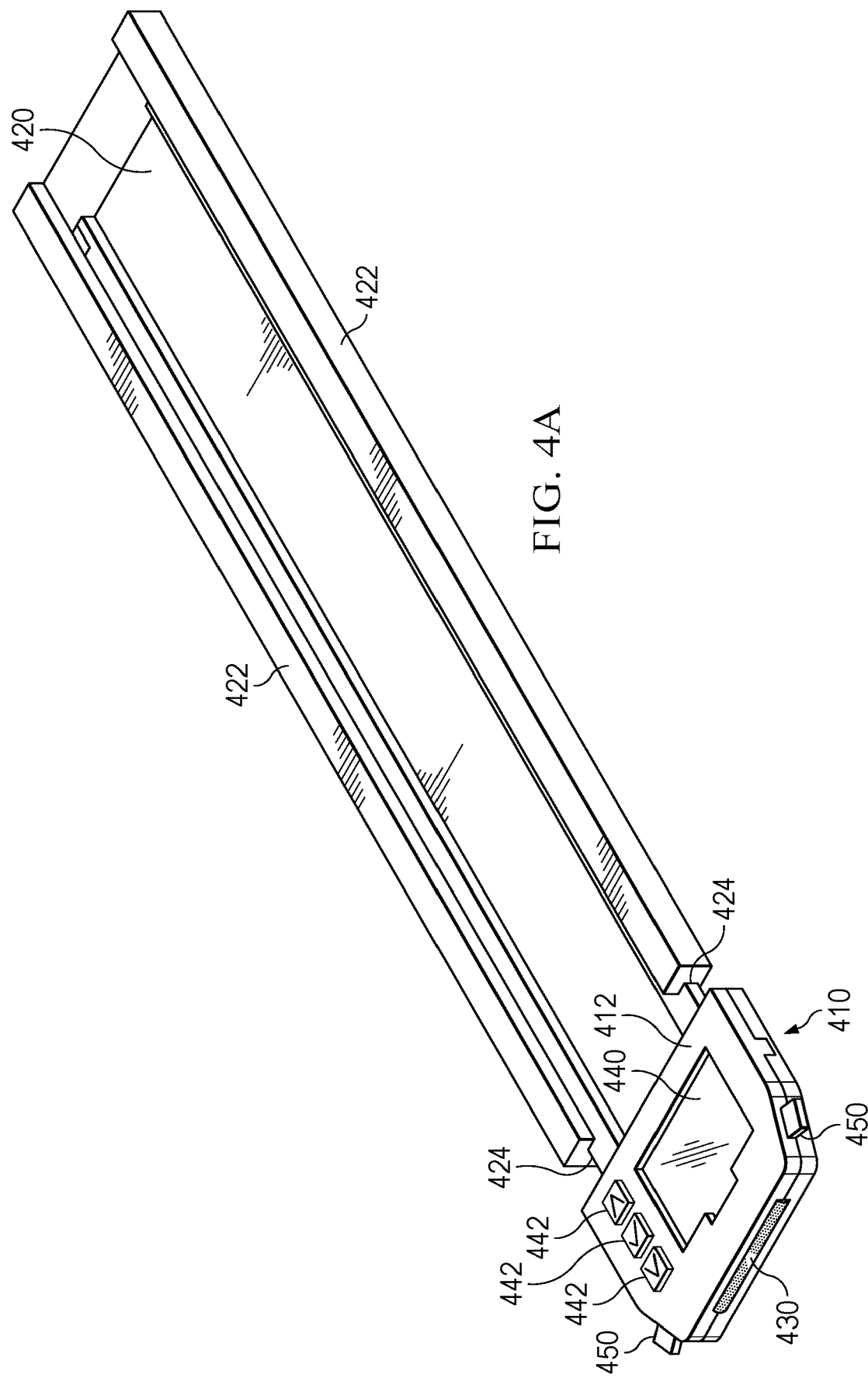
FIGS. 4A, 4B, 4C and 4D, generally referred to as FIG. 4, respectively show a perspective view, a side view, a front view, and a top view of an active information tag.
Figure 4B:
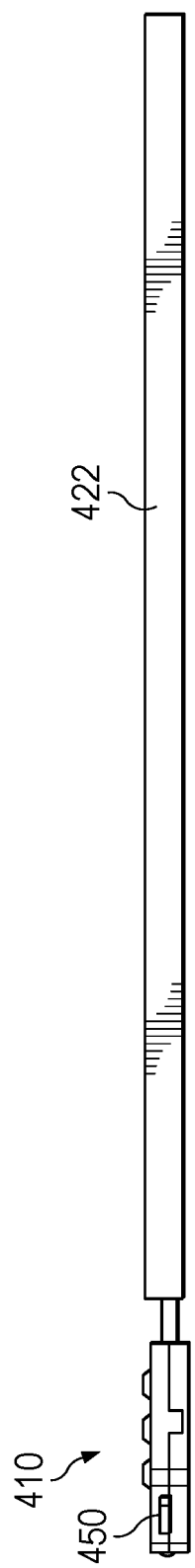
Figure 4C:
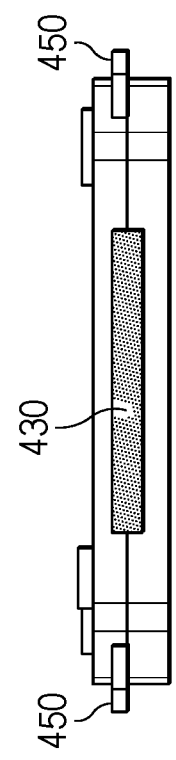
Figure 4D:
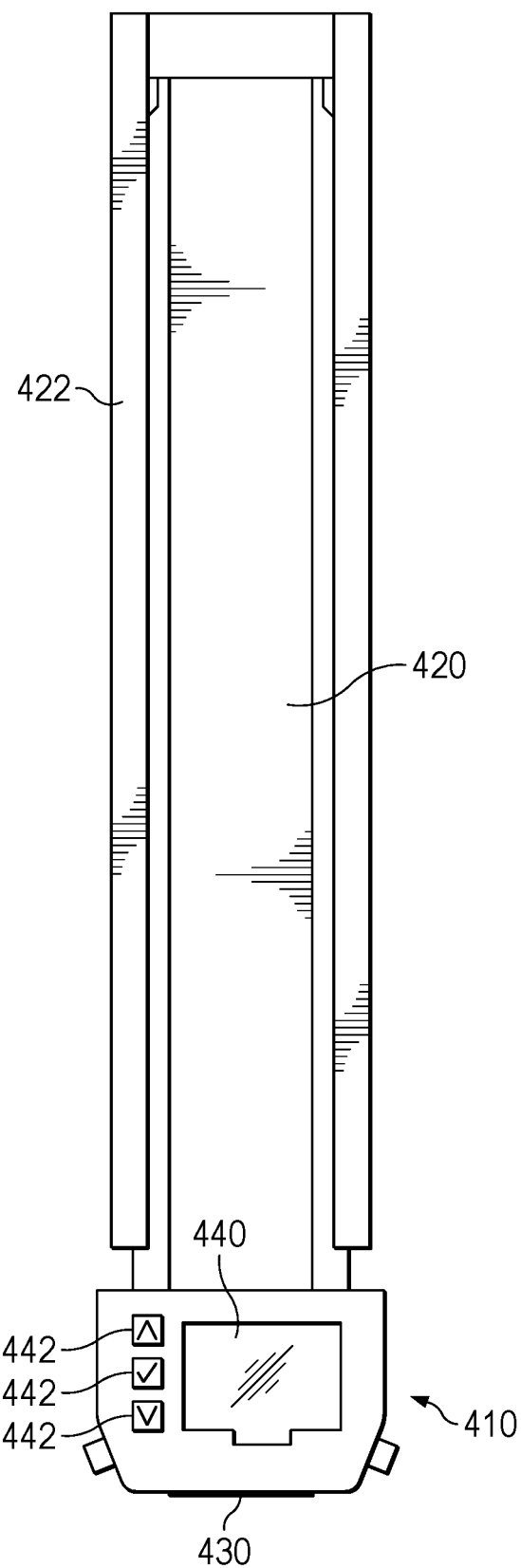

FIG. 3 shows a perspective view of an information handling system 100 having an active information tag device 130. As used herein, a tag broadly refers to a device attached to an asset such as an information handling system for the purpose of providing information regarding the attached asset. As used herein, an active information tag broadly refers to a tag where the provided information may be changed. In certain embodiments, the active information tag 130 includes a tag control portion 310, a behavior indication portion 320, or a combination thereof.

In certain embodiments, the active information tag 130 is fit within a recess defined by the information handling system 100. In certain embodiments the recess is provided by creating a void where a portion of the front edge (which may be composed of sheet metal) of the information handling system is folded back to provide a space between device components into which the active information tag 130 fits. In certain embodiments, the tag control portion, 310, the behavior indication portion 320, or a combination thereof, are visible when the active information tag 130 is in closed position. In certain embodiments, the recess is positioned along an edge of a front portion of the information handling system 100. In certain embodiments, the edge is a substantially bottom edge (i.e., within 15% of the bottom) of the front portion of the information handling system. In certain embodiments, the recess is located close to a lower left corner of the information handling system. In certain embodiments, the active information tag 130 is presented as a substantial horizontal continuation of a portion of a bezel (i.e., having less than a 5 mm gap from the bezel) of the front portion of the information handling system. In certain embodiments, the active information tag 130 provides a slim form factor (e.g., minimal Z height (e.g., less than 3 mm+/−10%)) solution for providing information handling system information.

In certain embodiments, the active information tag 130 provides a mechanism that moves control panel interaction zones from left or right rack edges to an area of the server which has traditionally been underutilized. Such an active information tag 130 enables maximum payload space for all server type information handling system architectures. Such an active information tag 130 does not sacrifice the user experience and consumes less space across the front of the server type information handling system. Such an active information tag 130 reduces complexity of rack edge designs. Such an active information tag 130 provides a slim display panel which is positioned along the chassis floor of a server type information handling system.

Such an active information tag 130 provides one or more of a plurality of functions including hardware branding and/or sub-branding (such as hardware type and model/series identification), platform and node behavior identification (e.g., via single and bi-color embedded LEDs), service and/or warranty information (which can include at-the-box technical publication repository portal access).

Such an active information tag 130 can provide platform and/or node behavior identification which includes a system health indication. In certain embodiments, such an active information tag 130 includes a system health indicator which facilitates locating a particular system within a data center. Such an active information tag 130 facilitates a determination of the health of a system which is visible from the front of the platform.

FIGS. 4A, 4B, 4C and 4D, generally referred to as FIG. 4, respectively show a perspective view, a side view, a front view, and a top view of an active information tag 400. In certain embodiments, the active information tag 400 corresponds to active information tag 130. In certain embodiments, the active information tag 400 includes a control portion 410, a display portion 420, or a combination thereof. In certain embodiments, the control portion 410, the display portion 420, or a combination thereof, are contained within a tag housing. In certain embodiments, the control portion 410 is contained within a control portion housing 412. In certain embodiments, the control portion housing 412 is part of the tag housing. In certain embodiments, the control portion housing is comprised of a relatively rigid material such as a rigid plastic material.

In certain embodiments, the display portion 420 includes an associated display housing 422. In certain embodiments, the display housing 422 is part of the tag housing. In certain embodiments, the display housing 422 defines grooves 424 via which the display portion 420 may be moved between a closed configuration and in an open configuration. In certain embodiments, the display housing 422 is configured to fit within a void defined by the information handling system.

In certain embodiments, the active information tag 400 further includes an information portion 430. In certain embodiments, the information portion 430 is integrated into the control portion 410. In certain embodiments, the control portion 410 includes a display zone 440. In certain embodiments, the display zone 440 is configured to present dynamic information regarding the information handling system. In certain embodiments, the control portion 410 includes one or more control buttons 442. In certain embodiments, the display zone 440 includes a light emitting diode (LED) type screen. In certain embodiments, the display zone includes an organic LED (OLED) screen. In certain embodiments, the information portion 430, the display zone 440, the control buttons 442, or a combination thereof are contained within the control portion housing 412. In certain embodiments, the dynamic information presented by the display zone 440 includes information handling system information including system information, error messages, QR codes, service tags, or a combination thereof. In certain embodiments, the control buttons 442 control which information is presented via the display zone. In certain embodiments, the dynamic information presented by the display zone is provided by an information handling system controller. In certain embodiments, the information handling system controller includes a baseboard management controller (BMC) such as an integrated Dell remote access controller (iDRAC) type BMC. In certain embodiments, the information to be presented is provided to the active information tag 400 via a bus such as a secure shell protocol (SSH) type bus, an inter-integrated circuit (I2C) type bus, or a combination thereof.

In certain embodiments, the display zone 440 of the control portion 410 is viewable when the active information tag 400 is in a closed configuration and in an open configuration. In certain embodiments, the control buttons 442 are configured to control content presented via the display zone 440 when the active information tag is in a closed configuration and in an open configuration. In certain embodiments, the information portion 430 is viewable when the active information tag is in a closed configuration and in an open configuration.

In certain embodiments, the control portion 410 is provided using a space which had previously been reserved for a static tag solution. Accordingly, no additional area of the front of the information handling system is required. Such an active information tag 130 can provide the information without a need for a specialized bezel containing information presentation functionality. Such an active information tag 130 allows the information to be provided in a zone of the front of the information handling system which relieves real estate pressure on the rack ears. In certain embodiments, the control portion 410 can include an electro physical switch or ambient light sensor which disables operation of the active information tag 130 to save power, reduce light pollution, minimize heat production, or a combination thereof, of the active information tag.

In certain embodiments, the active information tag 130 includes projections 450 which extend across a front portion of the active information tag 130. In certain embodiments, the projections 450 provide an additional place via which a user may pull out the active information tag 130 from the information handling system.

In certain embodiments, the information portion 430 includes one or more of light emitting diodes (LEDs). In certain embodiments, the information portion 430 includes four LEDs. In certain embodiments, the LEDs may be provided in a plurality of densities (e.g., 2, 4, 6, 8, etc.). In certain embodiments, the LEDs are edge mounted on a housing of the control portion 410. In certain embodiments, one or both more LEDs are red green blue (RGB) type LEDs. In certain embodiments, the LEDs enable provision of multi-behavior indications. In certain embodiments, the behavior indications include information handling system heath information. In certain embodiments, the behavior indications include health diagnosis information. In certain embodiments, the LEDs can provide behavior indications by varying one or more of colors, intensity and blink patterns.

In certain embodiments, the display portion 420 is viewable when the active information tag 400 is in the open configuration. In certain embodiments, the display portion 420 includes an LED based, flexible display. In certain embodiments, the display portion 420 is relatively flat and this is so as to not impede airflow of the information handling system. In certain embodiments, because the display portion is flexible it is usable in hard to reach locations such as the top or bottom of a server rack. In certain embodiments, the display portion 420 allows presentation of more information than is normally available via enterprise service tags. In certain embodiments, the information can be configured to scroll across the display portion 420. In certain embodiments, the information can include live data from a controller of the information handling system. In certain embodiments, the control portion 410, the display portion 420, or a combination thereof, enables a user to interactively diagnose errors associated with the information handling system.

In certain embodiments, the active information tag display portion 420 can include black & white or RGB LED arrays for richer viewing experiences. In certain embodiments, the active information tag includes an ability to interact with the menu systems of the display device, including images and text with variable scroll rate. In certain embodiments, actuating buttons of a control portion or holding a portion of the display device can produce a faster scroll rate. In certain embodiments, an underside of the active information tag is available for static stickers which may be used to read or scan when no power is applied to the active information tag.

Figure 5A:
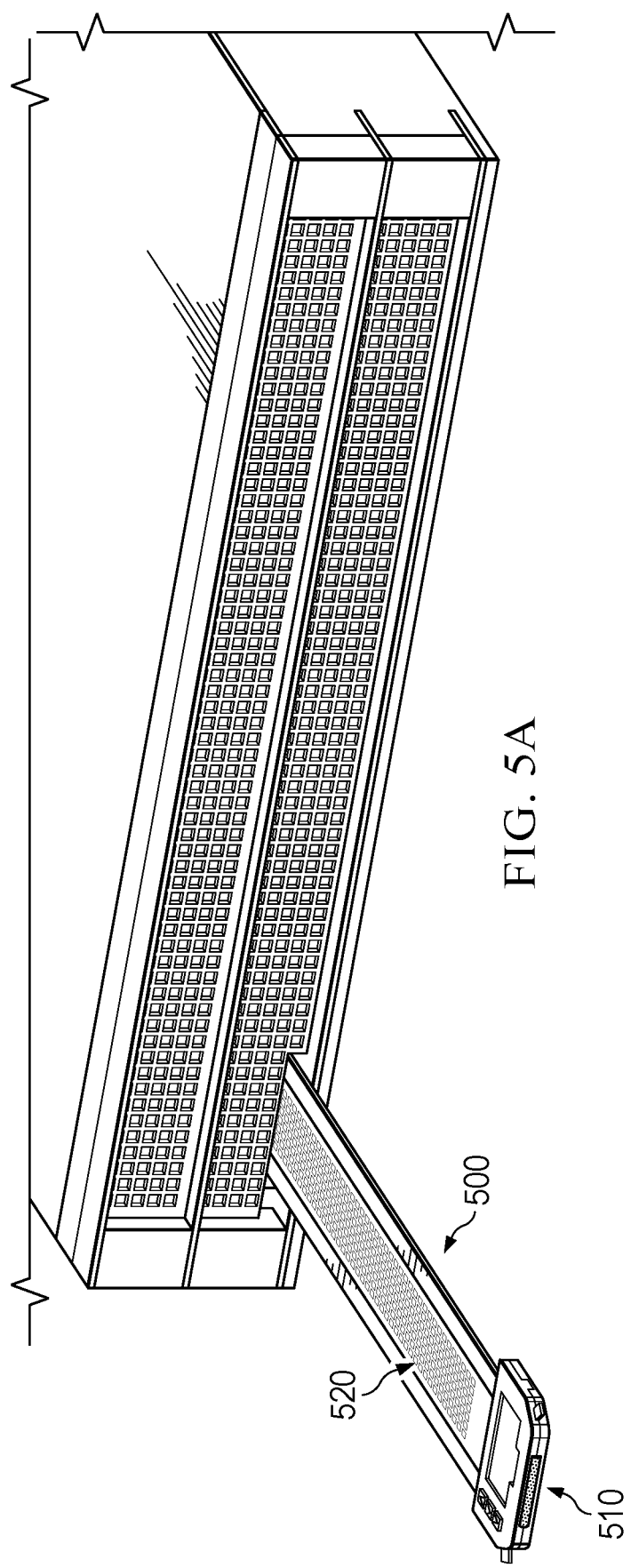
FIGS. 5A and 5B, generally referred to as FIG. 5, show an information handling system having an active information tag in an extended configuration.
Figure 5B:
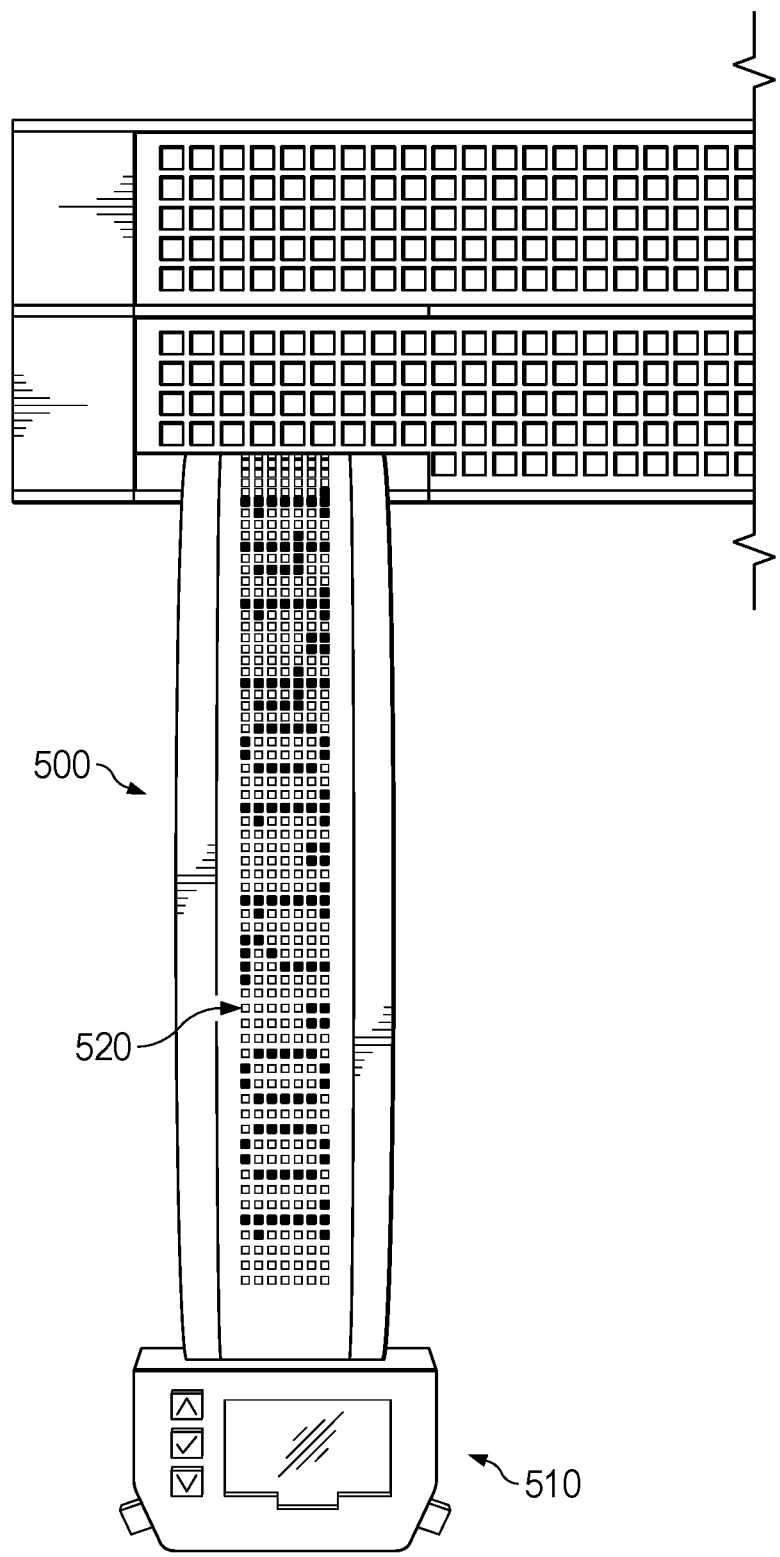

FIGS. 5A and 5B, generally referred to as FIG. 5, show an information handling system having an active information tag 500 in an extended configuration. In certain embodiments, the active information tag 500 corresponds to active information tag 130.

When the active information tag 500 is in the open configuration (i.e., an extended configuration), the active information tag 500 extends from a side of the information handling system 100. In certain embodiments, the active information tag 500 extends from a front side of the information handling system. In certain embodiments, the active information tag 500 extends from the information handling system by pulling on a control portion 510 of the active information tag 500. When the active information tag is in an open configuration, additional information is viewable on the active information tag 500 via a display portion 520.

In certain embodiments, the active information tag 500 is pulled from a closed configuration to the open configuration when a user desires additional interaction with the active information tag 500. When in the open configuration, the active information tag 500 provides additional information via the display portion 520. This display portion 520 is provided only using a space which had previously been reserved for a static tag solution. Accordingly, no additional area of the front of the information handling system is required. Such an active information tag 500 can provide the information without a need for a specialized bezel containing information presentation functionality. Such an active information tag 500 allows the information to be provided in a zone of the front of the information handling system which relieves real estate pressure on the rack ears.

In certain embodiments, the display portion 520 of the active information tag 500 is touch sensitive. In certain embodiments, the dynamic display 505 presents an active information tag user interface for interacting with information presented by the active information tag 500.

Figure 6A:
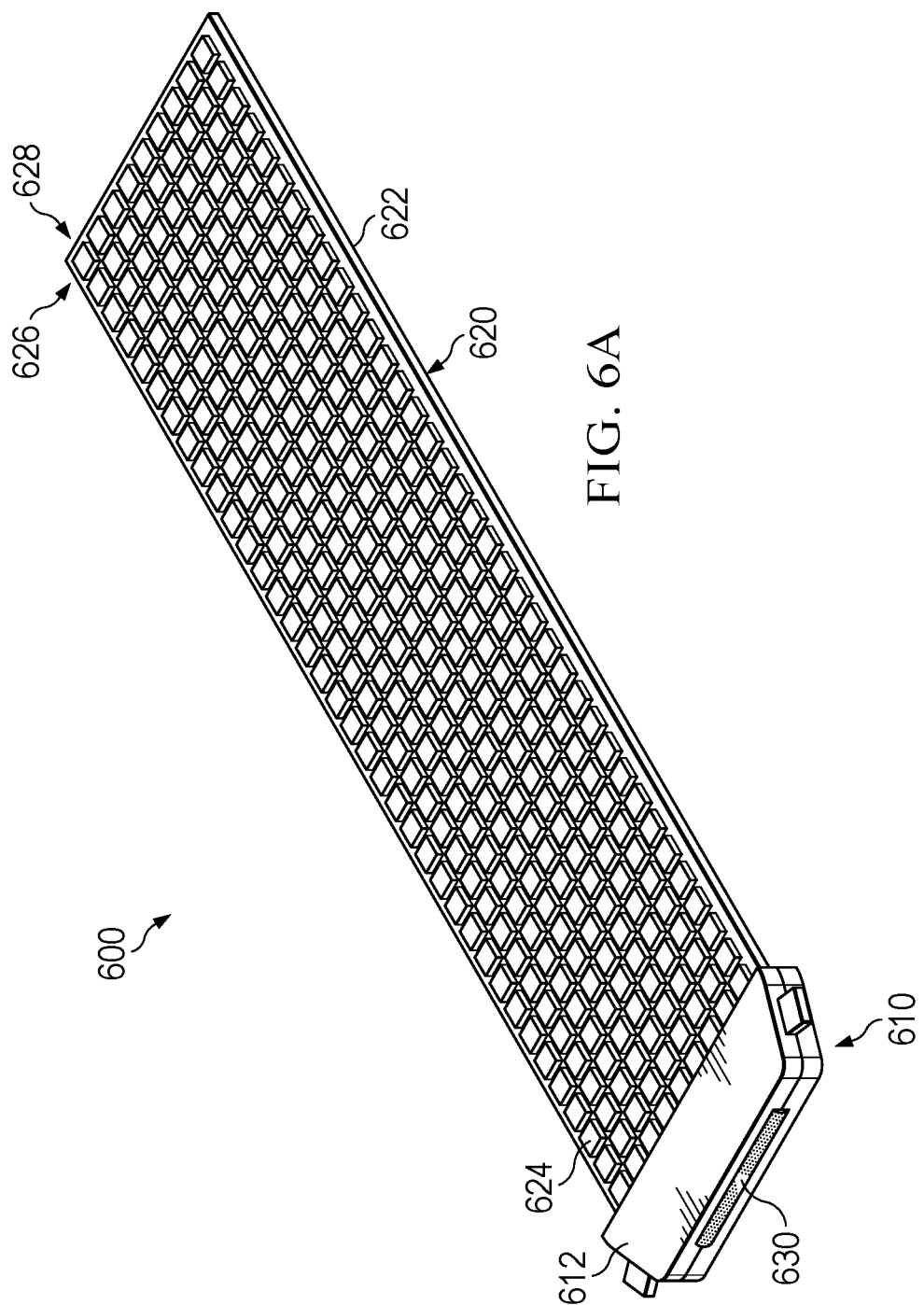
FIGS. 6A and 6B, generally referred to as FIG. 6, show respective active information tags with a display component.
Figure 6B:
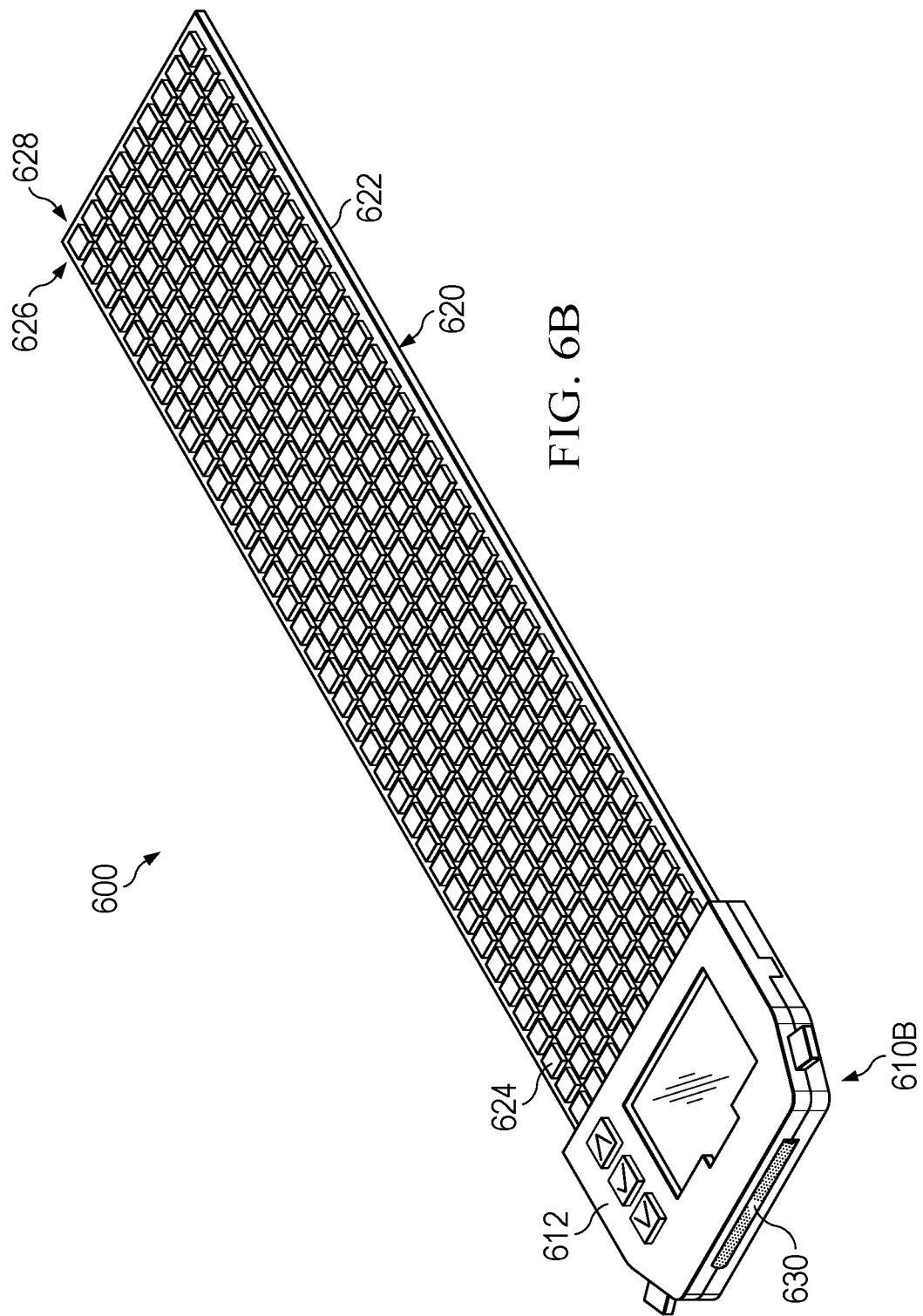

FIGS. 6A and 6B, generally referred to as FIG. 6, show respective active information tags with a display component. In certain embodiments, the active information tag 600 corresponds to active information tag 130. In certain embodiments, the active information tag 600 includes a control portion 610, a touch sensitive display portion 620, or a combination thereof. In certain embodiments, the control portion 610, the touch sensitive display portion 620, or a combination thereof, are contained within a tag housing. In certain embodiments, the control portion 610 is contained within a control portion housing 612. In certain embodiments, the control portion housing 612 is part of the tag housing. In certain embodiments, the control portion housing is comprised of a relatively rigid material such as a rigid plastic material.

In certain embodiments, the touch sensitive display portion 620 includes an associated display housing 622. In certain embodiments, the display housing 622 is part of the tag housing. In certain embodiments, the display housing 622 is configured to fit within a void defined by the information handling system. In certain embodiments, the touch sensitive display portion 620 includes a plurality of touch sensitive display elements 624. In certain embodiments, the display housing 622 includes electrical connections for coupling each of the plurality of display elements 624 with the control portion 610.

In certain embodiments, the plurality of touch sensitive display elements 624 are arranged in a repeating pattern. In certain embodiments, the plurality of touch sensitive display elements 624 are arranged in a repeating pattern of columns 626 of contiguous touch sensitive display elements and rows 628 of contiguous touch sensitive display elements. In certain embodiments, the touch sensitive display 620 includes a plurality of touch sensitive display elements 624 arranged in an 8 row×32 column configuration. In certain embodiments, combinations of the plurality of touch sensitive display elements 624 are activated to present dynamic information. In certain embodiments, the dynamic information presented by the combinations of the plurality of touch sensitive display elements 624 of the touch sensitive display portion 620 is controlled by the control portion 610, an information handling system controller, or a combination thereof. In certain embodiments, the information handling system controller includes a baseboard management controller (BMC) such as an integrated Dell remote access controller (iDRAC) type BMC. In certain embodiments, the information to be presented is provided to the active information tag 600 via a bus such as a secure shell protocol (SSH) type bus, an inter-integrated circuit (I2C) type bus, or a combination thereof.

In certain embodiments, the active information tag 600 further includes an information portion 630. In certain embodiments, the information portion 630 is integrated into the control portion 610. In certain embodiments, dynamic information presented by the information portion is provided by an information handling system controller. In certain embodiments, the information handling system controller includes a baseboard management controller (BMC) such as an integrated Dell remote access controller (iDRAC) type BMC. In certain embodiments, the information to be presented is provided to the active information tag 600 via a bus such as a secure shell protocol (SSH) type bus, an inter-integrated circuit (I2C) type bus, or a combination thereof.

In certain embodiments, the information portion 630 includes one or more of light emitting diodes (LEDs). In certain embodiments, the information portion 630 includes four LEDs. In certain embodiments, the LEDs may be provided in a plurality of densities (e.g., 2, 4, 6, 8, etc.). In certain embodiments, the LEDs are edge mounted on a housing of the control portion 610. In certain embodiments, one or both more LEDs are red green blue (RGB) type LEDs. In certain embodiments, the LEDs enable provision of multi-behavior indications. In certain embodiments, the behavior indications include information handling system heath information. In certain embodiments, the behavior indications include health diagnosis information. In certain embodiments, the LEDs can provide behavior indications by varying one or more of colors, intensity and blink patterns.

Referring to FIG. 6B, in certain embodiments, a control portion 610b can be associated with a touch sensitive display component 620. In certain embodiments, the control portion 610b corresponds to control portion 410.

Figure 7:
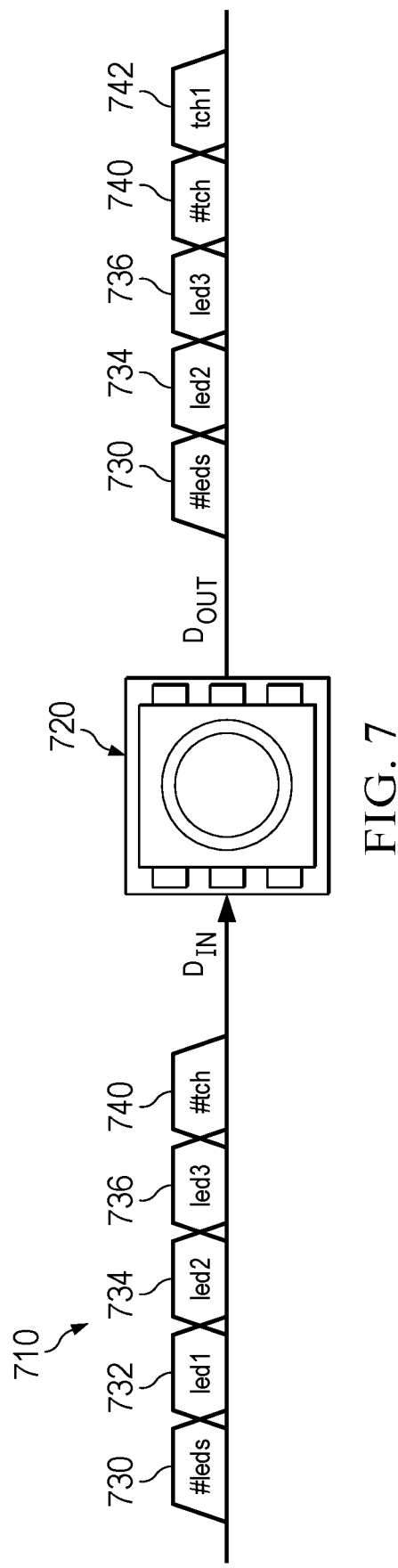
FIG. 7 shows a block diagram of operation of a touch sensitive display element used in a display component.

FIG. 7 shows a block diagram of the operation 700 of a touch sensitive display element used in a display component. In certain embodiments, a control portion (such as control portion 610) includes a micro control unit (MCU). In certain embodiments, the micro control unit manages a touch enhanced display component communication protocol 710. In certain embodiments, the touch enhanced display component communication protocol communicates with a plurality of touch enhanced display elements 720. As used herein, a touch enhanced display component communication protocol broadly refers to a display communication protocol for controlling a plurality of display elements which includes one or more touch detection indications.

In certain embodiments, some of all of the plurality of touch enhanced display elements include a neo pixel type light emitting diode. In certain embodiments, some or all of the plurality of touch enhanced display elements include a touch sensing function. In certain embodiments, the touch sensing function includes a capacitive sensing component (i.e., a capsense function). In certain embodiments, the touch sensing function is integrated into the surface of a respective display element, combination of contiguous display elements, or a combination thereof.

In certain embodiments, the touch enhanced communication protocol includes an initialization packet 730, one or more display element packets 732, 734, 736, a touch initialization packet 740, one or more touch detection packets 742, or a combination thereof. In certain embodiments, the touch enhanced communication protocol returns the touch detection indications to the MCU via a protocol feedback loop.

In operation, the MCU sends a stream of instructions to a sequence of display elements 720. In certain embodiments, the stream of instructions includes a plurality of packets where each display element has an associated packet. Each display element 720 removes a respective display element packet, and then relays the stream downstream. When a touch is detected by a display element 720, display element appends a touch detection packet to the stream of instructions. After the last display element 720 of the sequence receives its respective packet, the stream of instructions, which now can include one or more touch detection packets, is fed back to the MCU. The MCU then decodes the fed back stream to determine which display elements have been touched. In certain embodiments, determining which display elements 720 have been touched provides an indication of user intent regarding information presented via a display component comprised of the plurality of display elements 720.

In certain embodiments, the initialization packet 730 includes information which indicates how many display element packets follow. In certain embodiments, each display element packet includes presentation information for a respective display element 720. In certain embodiments, the display information includes RGB information, brightness information, blinking information, or a combination thereof.

In certain embodiments, a display element 720 consumes a respective display element packet and does not pass the respective display element packet down the chain (see e.g., the output of display element 720). In certain embodiments, the touch initialization packet 740 indicates how many touch sensor responses are present. In certain embodiments, the touch initialization packet 740 is updated by each display element 720 that detects a respective touch. In certain embodiments, the touch initialization packet 740 includes a touch count which is incremented by each display element 720 that detects a respective touch. In certain embodiments, the display element 720 appends a touch detection packet 740 to the chain when a touch of the display element 720 is detected. In certain embodiments, the touch detection packet 740 includes touch sense data such as touch intensity, touch duration, touch pattern, or a combination thereof.

Figure 8:
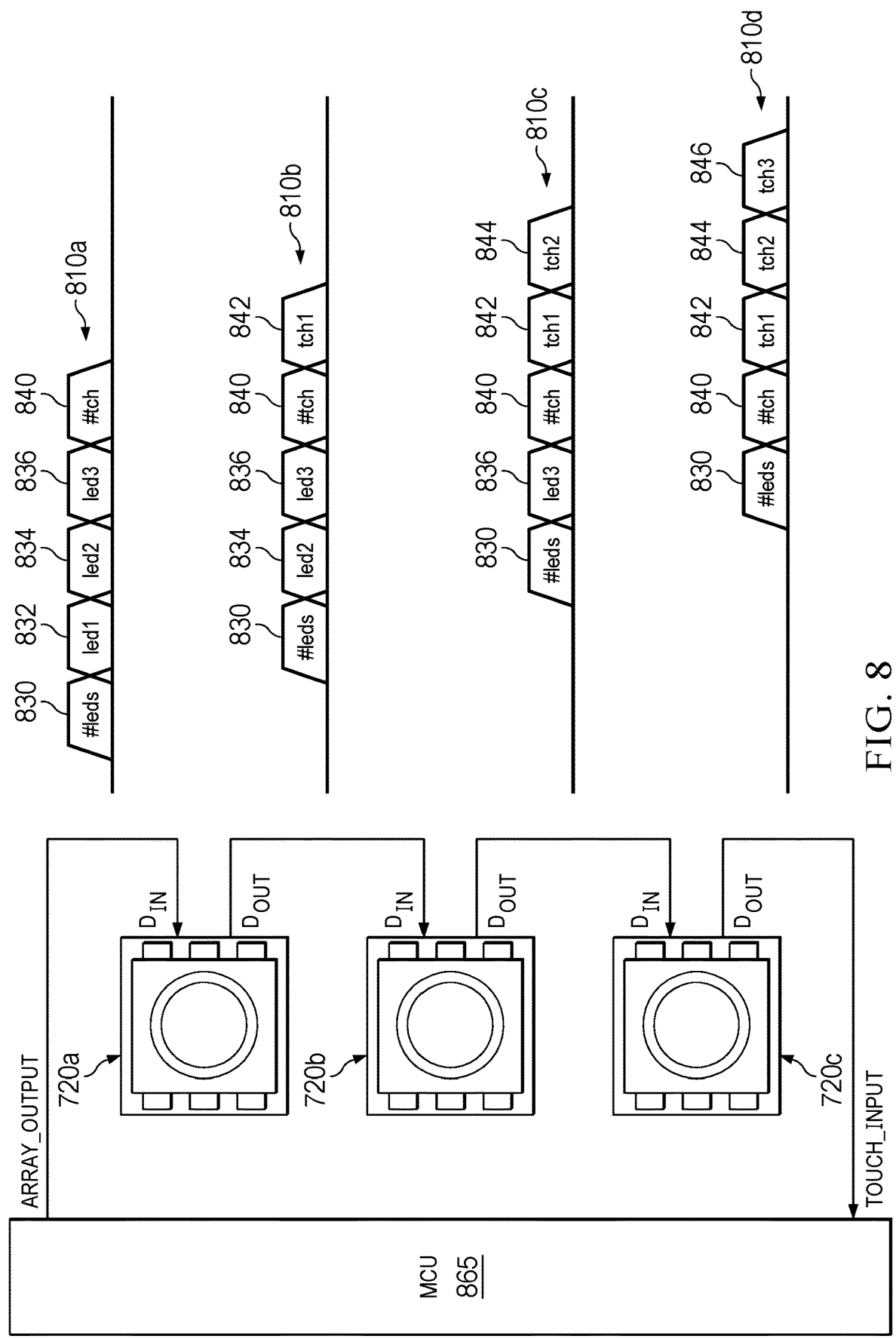
FIG. 8 shows a block diagram of the operation of a plurality of touch sensitive display elements used in a display component.

FIG. 8 shows a block diagram of the operation 800 of a touch sensitive display element used in a display component. In certain embodiments, a control portion (such as control portion 610) includes a micro control unit (MCU) 805. In certain embodiments, the micro control unit manages a touch enhanced display component communication protocol 810. In certain embodiments, the touch enhanced display component communication protocol communicates with a plurality of touch enhanced display elements 820a, 820b, 820c. As used herein, a touch enhanced display component communication protocol broadly refers to a display communication protocol for controlling a plurality of display elements which includes one or more touch detection indications.

In certain embodiments, some of all of the plurality of touch enhanced display elements 820a, 820b, 820c include a neo pixel type light emitting diode. In certain embodiments, some or all of the plurality of touch enhanced display elements include a touch sensing function. In certain embodiments, the touch sensing function includes a capacitive sensing component (i.e., a capsense function). In certain embodiments, the touch sensing function is integrated into the surface of a respective display element, combination of contiguous display elements, or a combination thereof.

In certain embodiments, the touch enhanced communication protocol 810 includes an initialization packet 830, one or more display element packets 832, 834, 836, a touch initialization packet 840, one or more touch detection packets 842, or a combination thereof. In certain embodiments, the touch enhanced communication protocol returns the touch detection indications to the MCU via a protocol feedback loop.

In operation, the MCU sends a stream of instructions to a sequence of display elements 820a, 820b, 820c. In certain embodiments, the stream of instructions include a plurality of packets where each display element has an associated packet (see e.g., communication stream 810a). Each display element 820 removes a respective display element packet (see e.g., see e.g., communication stream 810b), and then relays the stream downstream. When a touch is detected by a display element 820, display element appends a touch detection packet 842, 844, 846 to the stream of instructions. After the last display element 820 of the sequence receives its respective packet, the stream of instructions (see e.g., communication stream 810d), which now can include one or more touch detection packets, is fed back to the MCU 805. The MCU 805 then decodes the fed back stream to determine which display elements have been touched. In certain embodiments, determining which display elements 820 have been touched provides an indication of user intent regarding information presented via a display component comprised of the plurality of display elements 820.

In certain embodiments, the initialization packet 830 includes information which indicates how many display element packets follow. In certain embodiments, each display element packet includes presentation information for a respective display element 820. In certain embodiments, the display information includes RGB information, brightness information, blinking information, or a combination thereof. In certain embodiments, a display element 820 consumes a respective display element packet and does not pass the respective display element packet down the chain (see e.g., the output of display element 820). In certain embodiments, the touch initialization packet 840 indicates how many touch sensor responses are present. In certain embodiments, the touch initialization packet 840 is updated by each display element 820 that detects a respective touch. In certain embodiments, the touch initialization packet 840 includes a touch count which is incremented by each display element 820 that detects a respective touch. In certain embodiments, the display element 820 appends a touch detection packet 840 to the chain when a touch of the display element 820 is detected. In certain embodiments, the touch detection packet 840 includes touch sense data such as touch intensity, touch duration, touch pattern, or a combination thereof.

Figure 9:
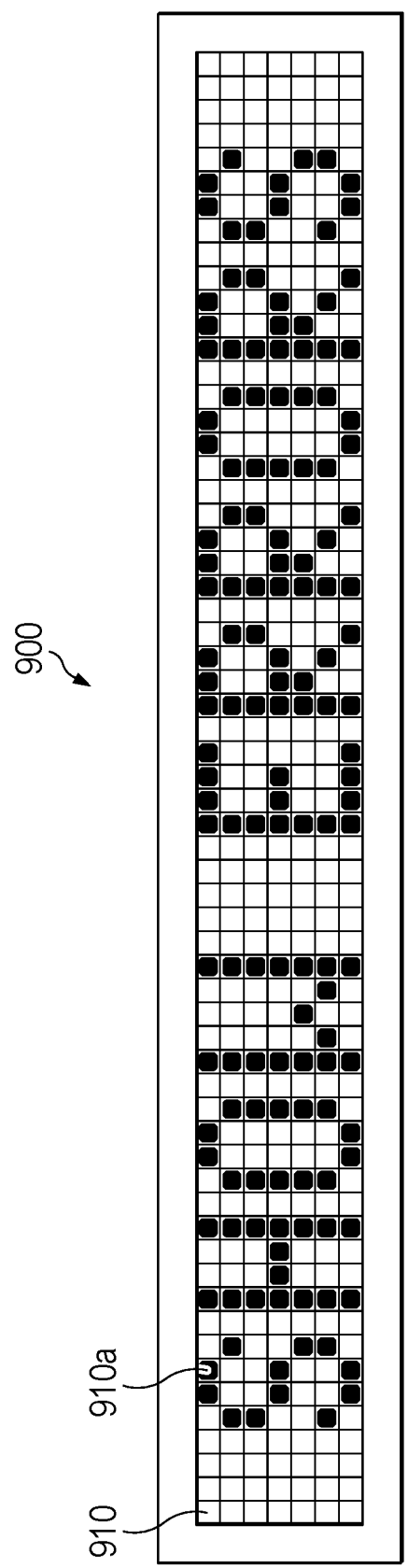
FIG. 9 shows an example screen presentation of a display component of an active information tag device.

FIG. 9 shows an example screen presentation of a display component 900 of an active information tag. In certain embodiments, the display component 900 corresponds to display portion 420.

In certain embodiments, the display component 900 includes a plurality of display elements 910. In certain embodiments, particular display elements (e.g., display element 910*a*) are actuated to present information. In certain embodiments, the actuation can include color actuation (which presents RGB information), brightness actuation (which presents brightness information), sequential actuation (e.g., which presents blinking information), or a combination thereof. In certain embodiments, combinations of particular display elements 910 may be actuated to present more complicated information such as symbols. In certain embodiments, combinations of particular display elements 910 may be actuated to present words. In certain embodiments, combinations of particular display elements 910 may be actuated to present information which scrolls across the display component 900.

Figure 10:
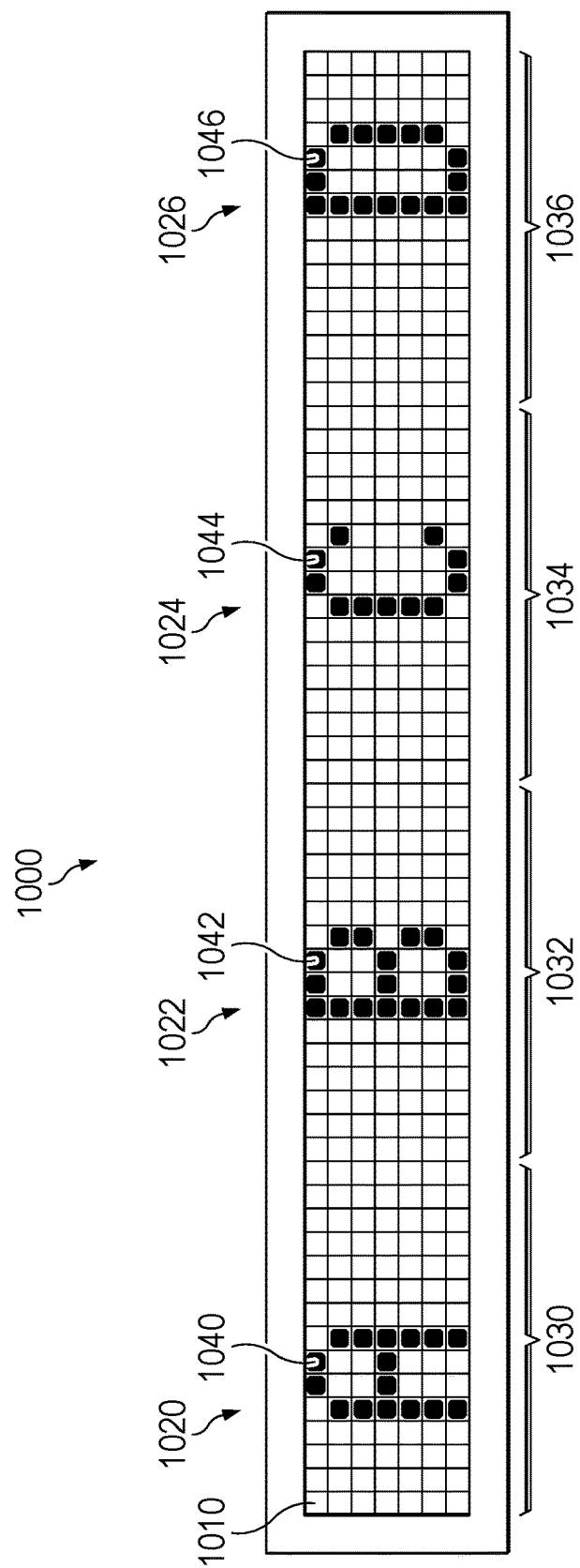
FIG. 10 shows an example screen presentation of a display component of an active information tag device.

FIG. 10 shows an example screen presentation of a display component of an active information tag. In certain embodiments, the display component 1000 corresponds to display portion 420.

In certain embodiments, the display component 1000 includes a plurality of display elements 1010. In certain embodiments, particular display elements (e.g., display element 1010*a*) are actuated to present information. In certain embodiments, the actuation can include color actuation (which presents RGB information), brightness actuation (which presents brightness information), sequential actuation (e.g., which presents blinking information), or a combination thereof. In certain embodiments, combinations of particular display elements 1010 may be actuated to present more complicated information such as symbols. In certain embodiments, combinations of particular display elements 1010 may be actuated to present words. In certain embodiments, combinations of particular display elements 1010 may be actuated to present information which scrolls across the display component 1000.

In certain embodiments, the display component 1000 is configured to include a plurality of touch zones 1020, 1022, 1024, 1026. In certain embodiments, each touch zone 1022 includes a plurality of rows and columns to provide a respective rectangular touch zone (1030, 1032, 1034, 1036) of the display component 1000. In certain embodiments, information (1040, 1042, 1044, 1046) may be presented within a respective touch zone 1020, 1022, 1024, 1026).

Other embodiments are within the following claims. For example, in certain embodiments, the plurality of touch sensitive display elements can be arranged in other types of repeating patterns. In certain embodiments, the plurality of touch sensitive display elements may be arranged in a plurality of alternating repeating patterns. In certain embodiments, the plurality of touch sensitive display elements may be arranged in a plurality of alternating patterns which produces one or more hexagon shaped patterns.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A display component for an active information tag comprising:
   a display component housing; and,
   a display portion, the display portion being controlled by an active information tag controller, the display portion comprising a plurality of touch sensitive display elements, the plurality of touch sensitive display elements being arranged on the display component housing in a repeating pattern, the repeating pattern including a repeating pattern of columns of contiguous touch sensitive display elements and a repeating pattern of rows of contiguous touch sensitive display elements, the plurality of touch sensitive display elements being activated to present dynamic information, the dynamic information being controlled to scroll content across the display portion and to present information within a plurality of predefined touch zones; and wherein
   the display component housing defines grooves, the display portion being configured to move between a closed configuration and an open configuration via the grooves, the plurality of touch sensitive display elements being accessible when the display component is in the open configuration; and wherein
   the plurality of touch sensitive display elements are controlled via a communication stream, the communication stream conforming to a touch enhanced display component communication protocol; and,
   a touch sensitive display element adds a touch detection packet to the communication stream when a touch of the touch sensitive display element is detected.

2. The display component of claim 1, wherein:
   the touch enhanced display component communication protocol comprises a plurality of packets, each of the plurality of touch sensitive display elements having a respective display element packet.

3. The display component of claim 1, wherein:
   the plurality of touch sensitive display elements include respective light emitting diodes.

4. The display component of claim 1, wherein:
   the plurality of touch sensitive display elements include respective capacitive sensing components.

5. An active information tag comprising:
   a tag housing, a portion of the tag housing being sized to fit within a recess of an information handling system;
   a control portion, the control portion including an information portion mounted to a front portion of the tag housing and coupled to the control portion, the information portion being visible when the tag housing is in a closed position relative to the information handling system; and,
   a display component coupled to the control portion, the display component comprising
      a display component housing; and,
      a display portion, the display portion being controlled by the control portion, the display portion comprising a plurality of touch sensitive display elements, the plurality of touch sensitive display elements being arranged on the display component housing in a repeating pattern, the repeating pattern including a repeating pattern of columns of contiguous touch sensitive display elements and a repeating pattern of rows of contiguous touch sensitive display elements, the plurality of touch sensitive display elements being activated to present dynamic information, the dynamic information being controlled to scroll content across the display portion and to present information within a plurality of predefined touch zones; and wherein
      the display component housing defines grooves, the display portion being configured to move between a closed configuration and an open configuration via the grooves, the plurality of touch sensitive display elements being accessible when the display component is in the open configuration; and wherein
   the plurality of touch sensitive display elements are controlled via a communication stream, the communication stream conforming to a touch enhanced display component communication protocol; and,
   a touch sensitive display element adds a touch detection packet to the communication stream when a touch of the touch sensitive display element is detected.

6. The active information tag of claim 5, wherein:
   the touch enhanced display component communication protocol comprises a plurality of packets, each of the plurality of touch sensitive display elements having a respective display element packet.

7. The active information tag of claim 5, wherein:
   the plurality of touch sensitive display elements include respective light emitting diodes.

8. The active information tag of claim 5, wherein:
   the plurality of touch sensitive display elements include respective capacitive sensing components.

9. A system comprising:
a processor;
a data bus coupled to the processor; and
an active information tag, the active information tag comprising
- a tag housing, a portion of the tag housing being sized to fit within a recess of an information handling system;
- a control portion, the control portion including an information portion mounted to a front portion of the tag housing and coupled to the control portion, the information portion being visible when the tag housing is in a closed position relative to the information handling system; and,
- a display component coupled to the control portion, the display component comprising
  - a display component housing; and,
  - a display portion, the display portion being controlled by the control portion, the display portion comprising a plurality of touch sensitive display elements, the plurality of touch sensitive display elements being arranged on the display component housing in a repeating pattern, the repeating pattern including a repeating pattern of columns of contiguous touch sensitive display elements and a repeating pattern of rows of contiguous touch sensitive display elements, the plurality of touch sensitive display elements being activated to present dynamic information, the dynamic information being controlled to scroll content across the display portion and to present information within a plurality of predefined touch zones; and wherein
  the display component housing defines grooves, the display portion being configured to move between a closed configuration and an open configuration via the grooves, the plurality of touch sensitive display elements being accessible when the display component is in the open configuration; and wherein
the plurality of touch sensitive display elements are controlled via a communication stream, the communication stream conforming to a touch enhanced display component communication protocol; and,
a touch sensitive display element adds a touch detection packet to the communication stream when a touch of the touch sensitive display element is detected.

10. The system of claim 9, wherein:
the touch enhanced display component communication protocol comprises a plurality of packets, each of the plurality of touch sensitive display elements having a respective display element packet.

11. The system of claim 9, wherein:
the plurality of touch sensitive display elements include respective light emitting diodes.

12. The system of claim 9, wherein:
the plurality of touch sensitive display elements include respective capacitive sensing components.

* * * * *